United States Patent
Nolfo et al.

(10) Patent No.: US 11,979,456 B2
(45) Date of Patent: May 7, 2024

(54) CLOUD PROVISIONING READINESS VERIFICATION

(71) Applicant: Dell Products, L.P., Round Rock, TX (US)

(72) Inventors: Andrew John Nolfo, Saint Louis, MO (US); Genaro Benitez, Jr., Cedar Park, TX (US); Chris Lee, Springfield, MO (US); Daniel E. Davila, Poughkeepsie, NY (US); Chad Molgaard, Plano, TX (US); Matthew P. Loveland, Wildwood, MO (US)

(73) Assignee: DELL PRODUCTS, L.P., Round Rock, TX (US)

( * ) Notice: Subject to any disclaimer, the term of this patent is extended or adjusted under 35 U.S.C. 154(b) by 0 days.

(21) Appl. No.: 17/576,155

(22) Filed: Jan. 14, 2022

(65) Prior Publication Data
US 2023/0231904 A1    Jul. 20, 2023

(51) Int. Cl.
| G06F 15/16 | (2006.01) |
| H04L 67/1008 | (2022.01) |
| H04L 67/1012 | (2022.01) |
| H04L 67/1014 | (2022.01) |

(52) U.S. Cl.
CPC ...... H04L 67/1012 (2013.01); H04L 67/1008 (2013.01); H04L 67/1014 (2013.01)

(58) Field of Classification Search
CPC .............. H04L 67/1012; H04L 67/1008; H04L 67/1014
USPC ......................................................... 709/224
See application file for complete search history.

(56) References Cited

U.S. PATENT DOCUMENTS

| 7,869,642 B2 * | 1/2011 | Dennison ............... G06V 10/32 382/132 |
| 8,504,689 B2 * | 8/2013 | Ferris .................. G06F 11/3006 709/250 |
| 8,788,669 B2 * | 7/2014 | Haskins .................. G06F 9/505 709/226 |

(Continued)

OTHER PUBLICATIONS

Hazard, "SoftLayer Private Clouds—Provisioning Speed," 2014, 12 pages, Softlayer an IBM Company, Retrieved from: http://www.blog.softlayer.com/tab/provisioning. (Year: 2014).*

(Continued)

*Primary Examiner* — Alicia Baturay
(74) *Attorney, Agent, or Firm* — Amin, Turocy & Watson, LLP

(57) ABSTRACT

Technology described herein can verify readiness of a customer tenant/customer for cloud provisioning based on the customer tenant. An example method comprises collecting, by a system comprising a processor, data based on user input from a customer tenant via a user interface, the data comprising information of a configuration setting that is to be used for cloud provisioning of a device based on the configuration setting. The method comprises, in response to collecting the configuration setting, analyzing, by the system, the configuration setting by comparing the configuration setting with respect to a selected rules check. The method comprises, in response to the analyzing of the configuration setting, determining, by the system, whether the configuration setting is acceptable for use in the cloud provisioning based on the configuration setting.

20 Claims, 10 Drawing Sheets

(56) References Cited

U.S. PATENT DOCUMENTS

| | | | |
|---|---|---|---|
| 9,092,837 B2* | 7/2015 | Bala | G06F 9/461 |
| 9,183,031 B2* | 11/2015 | Spiers | G06F 9/5077 |
| 9,235,801 B2* | 1/2016 | Portegys | G06N 3/04 |
| 9,590,875 B2* | 3/2017 | Assuncao | H04L 41/082 |
| 9,800,655 B2* | 10/2017 | Haskins | G06F 9/5011 |
| 10,009,284 B2* | 6/2018 | Khan | H04L 47/808 |
| 10,057,139 B2* | 8/2018 | Dong | H04L 67/1097 |
| 10,268,571 B2* | 4/2019 | Kulkarni | H04L 67/02 |
| 10,367,764 B2* | 7/2019 | Willshire | H04L 51/214 |
| 10,447,536 B2* | 10/2019 | Maiya Belur | H04L 67/10 |
| 10,484,427 B2* | 11/2019 | Healey | H04L 41/0863 |
| 10,491,689 B2* | 11/2019 | Kuchibhotla | H04L 47/783 |
| 10,511,540 B1* | 12/2019 | Norbeck, Jr. | H04L 47/781 |
| 10,567,248 B2* | 2/2020 | Chu | H04L 41/0896 |
| 10,587,490 B2* | 3/2020 | Smola | H04L 43/026 |
| 10,650,424 B2* | 5/2020 | Kolluri Venkata Sesha | G06Q 30/0631 |
| 10,674,313 B2* | 6/2020 | Smith | G06Q 10/047 |
| 10,713,073 B2* | 7/2020 | Liu | G06F 9/45558 |
| 10,817,345 B2* | 10/2020 | Arrasjid | H04L 41/5054 |
| 10,873,546 B2* | 12/2020 | Willshire | G06F 11/3664 |
| 10,877,876 B2* | 12/2020 | Kulkarni | H04L 43/50 |
| 10,936,618 B2* | 3/2021 | Apple | G06N 20/00 |
| 10,949,218 B2* | 3/2021 | Antonio | G06F 9/44505 |
| 10,970,186 B2* | 4/2021 | Salunke | G06F 11/079 |
| 11,215,955 B2* | 1/2022 | Aaron | G06F 18/2155 |
| 11,218,546 B2* | 1/2022 | Spoczynski | G06F 9/5072 |
| 11,296,781 B2* | 4/2022 | Calder | H04B 10/118 |
| 11,297,501 B2* | 4/2022 | Ramani | H04L 41/0813 |
| 11,307,062 B2* | 4/2022 | Zafar | H04Q 9/00 |
| 11,336,721 B2* | 5/2022 | Parulkar | H04L 67/1085 |
| 11,354,120 B1* | 6/2022 | Zhang | G06F 8/72 |
| 11,368,361 B2* | 6/2022 | Shadbolt | H04L 63/126 |
| 11,372,689 B1* | 6/2022 | Allen | G06F 9/4887 |
| 11,385,886 B2* | 7/2022 | Shmouely | G06F 11/3688 |
| 11,394,789 B2* | 7/2022 | Gupta | H04L 41/142 |
| 11,423,295 B2* | 8/2022 | Ritter | G06N 3/08 |
| 11,436,190 B2* | 9/2022 | Marelas | G06F 3/0665 |
| 11,477,280 B1* | 10/2022 | Irwin | H04L 67/51 |
| 11,489,585 B2* | 11/2022 | Calder | H04W 88/16 |
| 11,522,948 B1* | 12/2022 | Kairali | H04L 67/1012 |
| 11,605,042 B1* | 3/2023 | Perez | G06N 3/04 |
| 11,652,539 B2* | 5/2023 | Calder | H04W 16/28 455/12.1 |
| 2012/0131591 A1* | 5/2012 | Moorthi | G06F 9/5061 718/104 |
| 2012/0239739 A1* | 9/2012 | Manglik | G06F 8/61 709/203 |
| 2012/0297016 A1* | 11/2012 | Iyer | H04L 43/06 709/217 |
| 2013/0091285 A1* | 4/2013 | Devarakonda | G06F 9/4856 709/226 |
| 2015/0067171 A1* | 3/2015 | Yum | H04L 67/562 709/226 |
| 2016/0021196 A1* | 1/2016 | Gaurav | H04L 47/827 709/226 |
| 2017/0012854 A1* | 1/2017 | Balasubramanian | H04L 43/50 |
| 2017/0308856 A1* | 10/2017 | Bursey | G06F 16/29 |
| 2018/0359312 A1* | 12/2018 | Dabell | H04L 43/08 |
| 2020/0092404 A1* | 3/2020 | Wagmann | H04L 69/40 |
| 2021/0096977 A1* | 4/2021 | Desikachari | G06F 11/3495 |
| 2021/0157644 A1* | 5/2021 | Unnikrishnan | G06F 9/5072 |
| 2021/0160162 A1* | 5/2021 | Abbas | H04L 43/0817 |
| 2021/0208950 A1* | 7/2021 | Purushothaman | H04L 41/0823 |
| 2021/0209060 A1* | 7/2021 | Kottomtharayil | G06F 11/2064 |
| 2021/0319306 A1* | 10/2021 | Leite Pinheiro de Paiva | G06F 16/957 |
| 2021/0382798 A1* | 12/2021 | Ganesan | H04L 43/0876 |
| 2022/0164241 A1* | 5/2022 | Géhberger | G06F 9/485 |
| 2022/0188164 A1* | 6/2022 | Gerö | G06F 9/5072 |
| 2022/0239567 A1* | 7/2022 | Manuel-Devadoss | H04L 63/0421 |
| 2022/0277514 A1* | 9/2022 | Yin | G06T 7/529 |
| 2023/0018461 A1* | 1/2023 | Bourdev | H04N 19/42 |
| 2023/0070517 A1* | 3/2023 | Sharma | G06F 11/3692 |

OTHER PUBLICATIONS

HP "HP Device Provisioning Services" HP, https://www8.hp.com/h20195/v2/GetDocument.aspx?docname=4AA7-7559ENW, Last Accessed Aug. 28, 2023, 3 pages.

Lenovo "Deploy" Lenovo, https://www.lenovo.com/us/en/services/pc-services/deploy/provisioning/, Last Accessed Aug. 28, 2023, 4 pages.

Microsoft "Get started with On-Demand Assessments" Microsoft, https://learn.microsoft.com/en-us/services-hub/health/getting_started_with_on_demand_assessments, Last Accessed Aug. 28, 2023, 11 pages.

* cited by examiner

CLOUD PROVISIONING READINESS VERIFICATION

BACKGROUND

Cloud provisioning is a process whereby one or more devices registered, enrolled and/or provisioned based on one or more customer-provided and/or customer-selected configurations. Employing network connectivity, or any other suitable connection, a plurality of devices can be similarly registered, enrolled and/or provisioned, including provisioning of updates at a selected frequency.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present one or more concepts of the disclosure in a streamlined form as a prelude to the more detailed description that is presented later.

An example method can comprise collecting, by a system comprising a processor, data based on user input from a customer tenant via a user interface, the data comprising information of a configuration setting that is to be used for cloud provisioning of a device based on the configuration setting. The method can comprise, in response to collecting the configuration setting, analyzing, by the system, the configuration setting by comparing the configuration setting with respect to a selected rules check. The method can comprise, in response to the analyzing of the configuration setting, determining, by the system, whether the configuration setting is acceptable for use in the cloud provisioning based on the configuration setting.

In one or more cases, the collecting and analyzing can be repeatedly executed at a selected frequency, such as automatically without additional authorization from the customer tenant.

An example system can comprise a processor, and a memory that stores executable instructions that, when executed by the processor, facilitate performance of operations. The operations can comprise obtaining a request to perform a cloud provisioning readiness check of configuration settings associated with a customer tenant, analyzing the configuration settings associated with the customer tenant prior to execution of cloud provisioning based on the configuration settings, and, in response to the analyzing, determining whether the configuration settings, as a group, are acceptable.

An example non-transitory computer-readable medium can comprise executable instructions that, when executed by a processor, can facilitate performance of operations. The operations can comprise accessing customer tenant configurations via a cloud network connected to a customer tenant device of a customer tenant comprising the customer tenant configurations, performing a rule-based analysis of the customer tenant configurations, wherein the rule-based analysis is based on rules determined to be applicable to cloud provisioning at least one endpoint device to be performed according to provisioning configurations to be defined, and based on a result of the rule-based analysis, outputting an indication of readiness or non-readiness of the customer tenant configurations for use in defining the provisioning configurations.

BRIEF DESCRIPTION OF THE DRAWINGS

The technology described herein is illustrated by way of example and not limited in the accompanying figures in which like reference numerals indicate similar elements.

DETAILED DESCRIPTION

Overview

Figure 1:
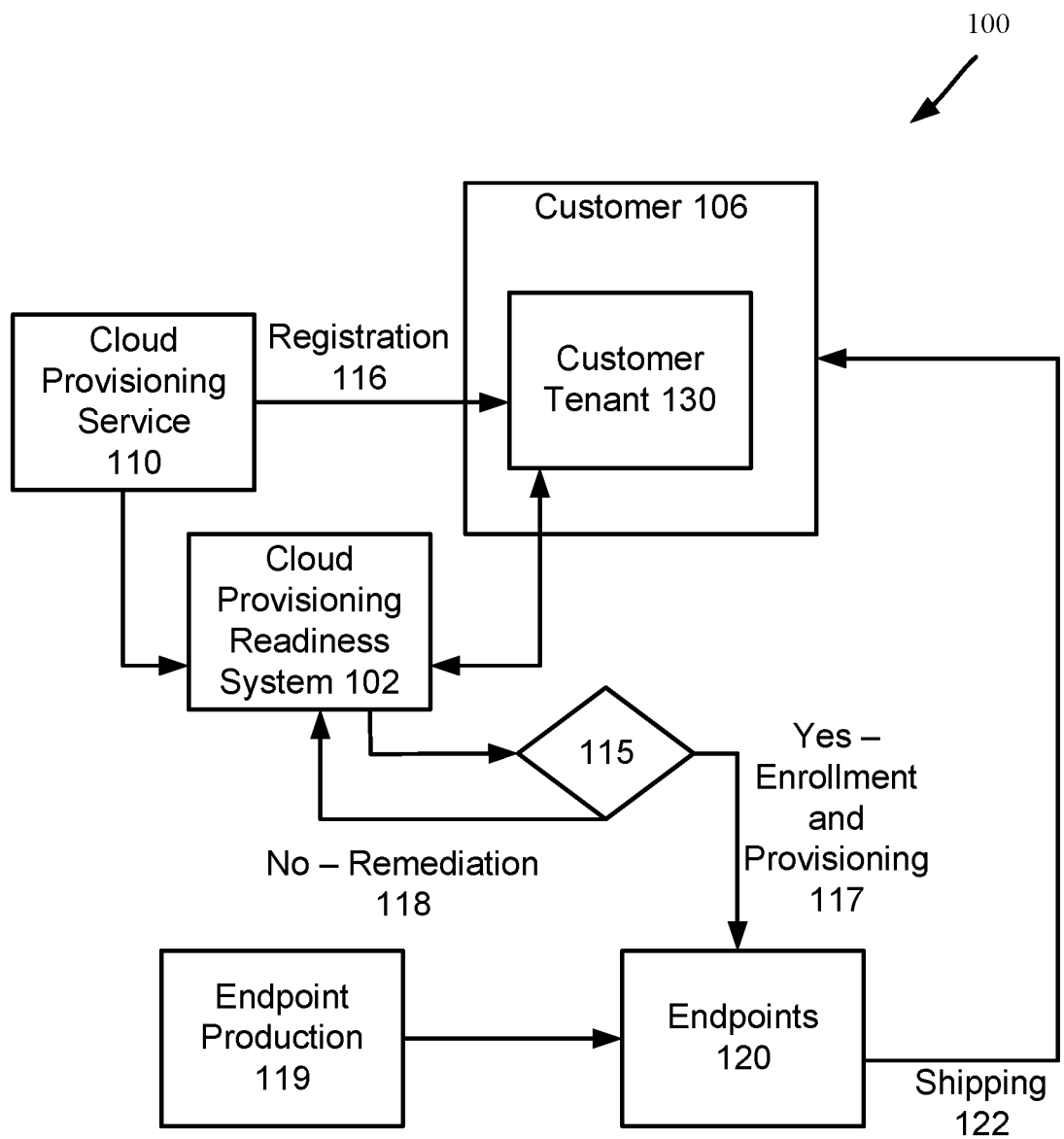
FIG. 1 illustrates a schematic representation of a cloud provisioning process comprising a readiness check, in accordance with one or more embodiments and/or implementations described herein.

The technology described herein is generally directed towards an efficient process to determine readiness for cloud provisioning of one or more devices. The devices can comprise, but are not limited to, one or more endpoints such as laptops, desktops, mobile phones, tablets, servers, and/or virtual environment devices. The cloud provisioning allows for an end user entity to receive a device that is fully configured and ready to be used.

A cloud provisioning check can be performed by and/or employing one or more systems, methods and/or non-transitory computer readable mediums described herein. The readiness check can be performed as part of an onboarding process for provisioning services. The readiness check can evaluate customer and/or customer tenant readiness for provisioning relative to one or more thresholds, to thereby reduce configuration errors, reduce provisioning downtime, reduce post-provisioning troubleshooting, improve efficiency and/or improve overall customer satisfaction. As used herein a customer tenant refers to a group of user entities that share a common access with specific privileges to software, applications, hardware, servers, networks and/or the like. Entities in a tenant can share configurations, access and/or security protocols.

One or more embodiments of devices, systems, methods and/or non-transitory machine-readable mediums will be described herein that can provide one or more advantages while addressing the one or more deficiencies of existing techniques of existing cloud provisioning.

In one or more cases, even where a customer is not aware of configuration setting affecting and/or impacting cloud provisioning, and/or even where a customer and a server provider can have differing interpretations of one or more configurations, efficient readiness verification can be facilitated. Furthermore, delays, manual touch points, data inaccuracies, subjective data gathering and/or data inaccuracies can be reduced and/or eliminated as compared to existing provisioning techniques.

Indeed the one or more embodiments described herein can provide an automated process for configuration checking, and with client permission, can also provide automatic adjustments to configurations of a client tenant. This can reduce errors introduced by manual, time-consuming and/or labor-intensive existing provisioning readiness processes. Reduced back-and-forth between provisioning services and customer can be facilitated. Further, monitoring access to the readiness check can be provided to the client, such as via an easily accessible portal, webpage, graphical user interface (GUI) and/or the like.

Moreover, the automatic readiness check can be executed utilizing a cloud provider's native authentication method. A cloud provider's native application programming interface (API) calls can be employed to collect data. In this way, as little as read only access can be sufficient to analyze configurations, without making unauthorized changes to a client's tenant. That is, via as little as a data collection-only process, security of a client tenant can be maintained. Furthermore, data being viewed and/or analyzed can be displayed and/or recorded for use in data security compliance measures, for example, of the client. Non-used data of the client tenant is not targeted for analysis and/or collection. As used herein, the terms "customer" and "client" can be used interchangeably. As a result, the readiness check can be performed, generally seamlessly and automatically.

Generally, upon completion of data gathering, the one or more systems described herein can send, upload, download and/or otherwise transmit the collected data to a secure storage location. The system and/or the client can access that data. Automated rule checks can be run to determine a customer readiness state for provisioning services. An automated report output can be generated and identify the customer readiness state.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, the term "entity" can refer to a machine, device, smart device, component, hardware, software and/or human.

As used herein, the term "cost" can refer to power, money, memory, processing power and/or the like.

As used herein, the term "resource" can refer to power, money, memory, processing power and/or the like.

Example Readiness Check Architectures

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architecture 100 as illustrated at FIG. 1, and/or systems thereof, can further comprise one or more computer and/or computing-based elements described herein with reference to an operating environment, such as the operating environment 900 illustrated at FIG. 9. In one or more described embodiments, computer and/or computing-based elements can be used in connection with implementing one or more of the systems, devices, components and/or computer-implemented operations shown and/or described in connection with FIG. 1 and/or with other figures described herein.

Turning first to FIG. 1, a non-limiting system architecture 100 is illustrated that can perform cloud provisioning of one or more endpoints 120 for a customer 106, and which non-limiting system architecture 100 can employ a cloud provisioning readiness system 102, in accordance with one or more embodiment described herein. The non-limiting system 100 can comprise a cloud provisioning service 110 that can provide registration 116 of the one or more endpoints 120 at a customer tenant 130/unified endpoint management system of the customer 106. The customer tenant 130/unified endpoint management (UEM) system can be and/or comprise a cloud-based system for management, security and/or identity across endpoints of the customer tenant 130. The endpoints 120 (also herein referred to as endpoint devices 120) can be produced at and/or provided by endpoint production 119. As used herein, the customer 106 can be an entity, such as an organization, group, company and/or the like, comprising one or more machines, devices, smart devices, components, hardware, software and/or humans.

The cloud provisioning service 110 can employ a cloud provisioning readiness system 102 to verify and/or validate one or more customer tenant configurations as having a state of readiness, prior to performing cloud provisioning of the endpoints 120. The customer tenant configurations can be access from the customer tenant 130/UEM system, in one or more cases. Based on analysis performed by the cloud provisioning readiness system 102, a decision 115 can be made as to whether or not the customer tenant configurations meet a selected state of readiness.

Where the state of readiness is not met, remediation 118 of one or more failed customer tenant configurations can be performed, such as by the cloud provisioning readiness system 102. The cloud provisioning readiness system 102 can then re-analyze the customer tenant configurations of the customer tenant 130/UEM system.

Where the state of readiness is met, enrollment and cloud provisioning 117 of one or more endpoints 120 can be performed. In response to this execution, shipping 122 of the endpoints can be performed to the customer tenant 130.

Figure 2:
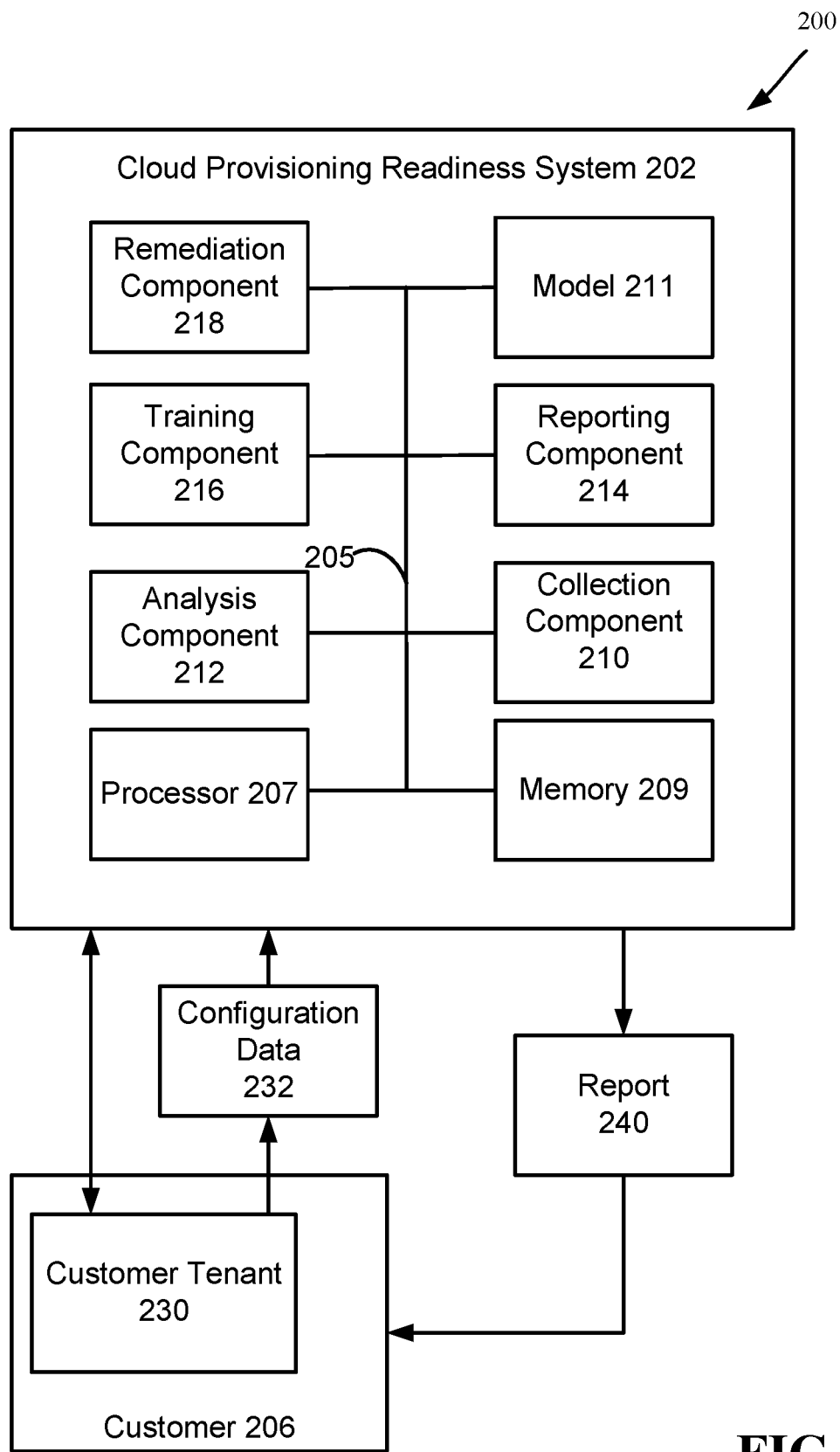
FIG. 2 illustrates a block diagram of a system for facilitating cloud provisioning readiness verification, in accordance with one or more embodiments and/or implementations described herein.

Turning next to FIG. 2, a schematic of another non-limiting system 200 is depicted, illustrating details of a cloud provisioning readiness system 202 for performing rule-based analysis of configurations based on configuration data 232 from a customer tenant 230. While referring here to one or more processes, operations, facilitations and/or uses of the non-limiting system 200, description provided herein, above and/or below also can be relevant to one or more other non-limiting system architectures described herein. Repetitive description of like elements and/or processes employed in respective embodiments is omitted for sake of brevity.

Generally, the non-limiting system architecture 200 can facilitate a process to automatically determine readiness (e.g., comprising data collection, analysis and report) prior to completion of a cloud provisioning process of one or more endpoints for the customer 206. The non-limiting system architecture 200 also can facilitate, in one or more cases, automatic remediation and/or provide recommended remediation relative to one or more configurations (e.g., customer tenant configurations) that do not satisfy a rule-based analysis performed by the cloud provisioning readiness system 202 of the non-limiting system architecture 200. As used herein, the customer 206 can be an entity, such as an organization, group, company and/or the like, comprising one or more machines, devices, smart devices, components, hardware, software and/or humans.

FIG. 2 illustrates the non-limiting system architecture 200 comprising the cloud provisioning readiness system 202 and a customer tenant 230/UEM system. Generally, the cloud provisioning readiness system 202 can leverage UEM-provided API calls to collect configuration data 232, and can analyze that data to determine a state of readiness for the customer 206. The state of readiness can be for all customer tenant configurations, one or more groups of customer tenant configurations and/or for one or more customer tenant configurations. The customer tenant configurations can be based on and/or comprise the configuration data 232 collected and analyzed. The varying one or more states of readiness can be output in a report 240, such as for use by the customer 206 and/or by a cloud provisioning service provider (e.g., an entity employing the cloud provisioning readiness system 202).

The various components of the cloud provisioning readiness system 202 will now be described in detail. Generally, the cloud provisioning readiness system 202 can comprise any suitable computing devices, hardware, software, operating systems, drivers, network interfaces and/or so forth. However, for purposes of brevity, only components generally relevant to cloud provisioning readiness verification are illustrated in FIG. 2.

As illustrated, the cloud provisioning readiness system 202 can comprise a processor 207, memory 209, bus 205, collection component 210, analysis component 212, reporting component 214, training component 216 and/or remediation component 218.

Communication among the cloud provisioning readiness system 202, customer 206, customer tenant 230, the components of the cloud provisioning readiness system 202, and/or any other component of the non-limiting system architecture 200 can be by any suitable method. Communication can be facilitated by wired and/or wireless methods including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLU-ETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion first turns to the processor 207, memory 209 and bus 205 of the cloud provisioning readiness system 202.

In one or more embodiments, cloud provisioning readiness system 202 can comprise a processor 207 (e.g., computer processing unit, microprocessor, classical processor and/or like processor). In one or more embodiments, a component associated with cloud provisioning readiness system 202, as described herein with or without reference to the one or more figures of the one or more embodiments, can comprise one or more computer and/or machine readable, writable and/or executable components and/or instructions that can be executed by processor 207 to facilitate performance of one or more processes defined by such component(s) and/or instruction(s). In one or more embodiments, the processor 207 can comprise one or more of the collection component 210, analysis component 212, reporting component 214, training component 216 and/or remediation component 218.

In one or more embodiments, the cloud provisioning readiness system 202 can comprise a machine-readable memory 209 that can be operably connected to the processor 207. The memory 209 can store computer-executable instructions that, upon execution by the processor 207, can cause the processor 207 and/or one or more other components of the cloud provisioning readiness system 202 (e.g., collection component 210, analysis component 212, reporting component 214, training component 216 and/or remediation component 218) to perform one or more actions. In one or more embodiments, the memory 209 can store computer-executable components (e.g., collection component 210, analysis component 212, reporting component 214, training component 216 and/or remediation component 218).

Cloud provisioning readiness system 202 and/or a component thereof as described herein, can be communicatively, electrically, operatively, optically and/or otherwise coupled to one another via a bus 205 to perform functions of non-limiting system architecture 200, cloud provisioning readiness system 202 and/or one or more components thereof and/or coupled therewith. Bus 205 can comprise one or more of a memory bus, memory controller, peripheral bus, external bus, local bus and/or another type of bus that can employ one or more bus architectures. One or more of these examples of bus 205 can be employed to implement one or more embodiments described herein.

In one or more embodiments, cloud provisioning readiness system 202 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the non-limiting system architecture 200 can reside in the cloud, and/or can reside locally in a local computing environment (e.g., at a specified location(s)).

In addition to the processor 207 and/or memory 209 described above, cloud provisioning readiness system 202 can comprise one or more computer and/or machine readable, writable and/or executable components and/or instructions that, when executed by processor 207, can facilitate performance of one or more operations defined by such component(s) and/or instruction(s).

Figure 3:
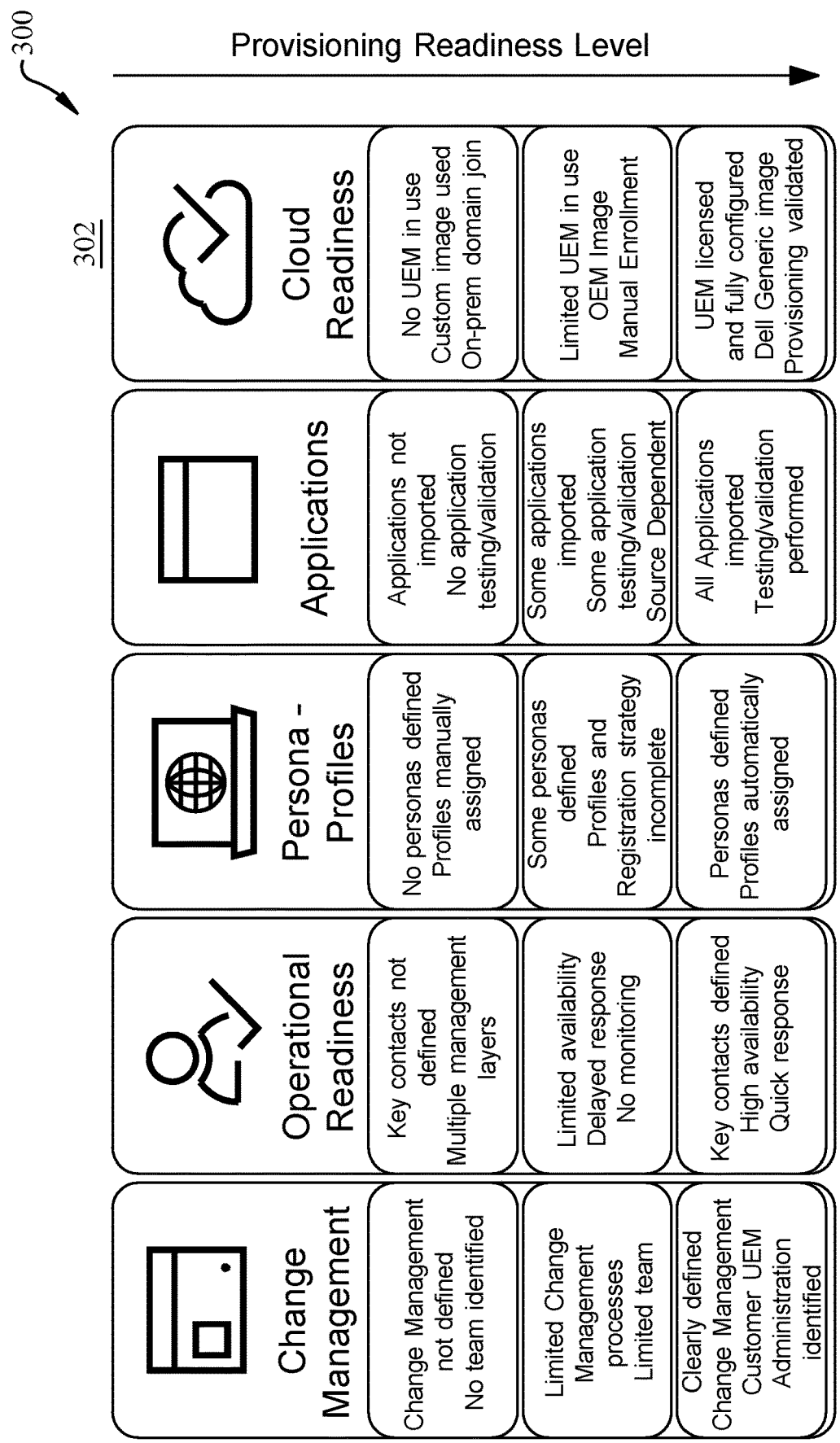
FIG. 3 illustrates exemplary operations that can be completed as part of a provisioning readiness check, in accordance with one or more embodiments and/or implementations described herein.

Discussion now turns briefly to FIG. 3, which illustrates various readiness domains, including cloud provisioning readiness, that can be performed as part of an overall readiness check for the customer 206. The schematic 300 is illustrated as an exemplary representation of how the cloud provisioning readiness 302 fits into the overall cloud provisioning readiness schematic 300.

The various readiness domains can comprise change management, operational readiness, persona-profiles, applications and/or cloud readiness 302, among others. The y-axis scale can represent a readiness level that increases from top to bottom for any of the readiness domains. For example, the cloud readiness domain 302 can span from no UEM in use to UEM licensed and fully configured. The domains and levels within each domain are but examples depicted to illustrate how improvement in the cloud readiness domain can significantly improve speed and efficiency of achieving a total readiness level.

Turning now again to FIG. 2, and to components of the cloud provisioning readiness system 202 other than the processor 207, memory 209 and bus 205, the collection component 210 generally can collect data from a customer tenant, such as the configuration data 232. The data to collect can be determined, such as by employing one or more API calls and/or programmatic logic for and/or relative to configuration data 232. These API calls and/or programmatic logic can be based on and/or direct to information/data/metadata that upon which one or more provisioning configurations can be defined. These provisioning configurations can be utilized by the cloud provisioning provider for cloud provisioning of customer endpoints. The configuration data 232 collected can define the customer tenant configurations that themselves can be utilized as and/or define the provisioning configurations.

In one or more cases, the cloud provisioning readiness system 202 provides full accountability to the customer/customer tenant. For example, data being gathered can be displayed to the customer tenant, such as at the time of access. The display can be by way of a report 240 or other portal, website, and/or accessible medium. Alternatively and/or additionally, the access can be recorded, such that the customer tenant has full understanding of what data is accessed, such as can be used for security compliance purposes by the tenant.

That is, PII information is not collected, and only that information (e.g., configuration information 232) relevant to configuration settings is queried, accessed, read and/or otherwise collected. Instead, the collection component 210 can query the most relevant subsets of data and/or data objects that apply to endpoint cloud provisioning. For example, the configuration information 232 can be tied, such as directly, to how an endpoint should be provisioned, such as applications, group memberships and assignments, policy and profile settings, and/or other device management criteria. These datasets also can have multiple properties that can be configured, where the cloud provisioning can be directly related to the proper configuration of these dataset properties. That is, the combinations of the targeted datasets collected and their associated properties can be aspects employed for determining customer provisioning readiness.

The identified configuration data 232 can be downloaded, uploaded, copied and/or otherwise collected and/or obtained. By leveraging connection to a customer cloud network, upon obtaining suitable authorization from the customer, such collecting can be executed. In one or more cases the collecting can comprise uploading data to a secure cloud location of the cloud provisioning provider service, such as in the form of SML files and/or other suitable formats.

Access can be executed based on various different scenarios. The collection component 210 can operate to access the customer tenant configurations, such as via a cloud network, in response to a request from the cloud provisioning service, in response to a request from the customer tenant 230 and/or as a function of ongoing monitoring of continued readiness of the customer tenant configurations. For example, monitoring can comprise the collecting and analysis of data, along with reporting a state of readiness, at any suitable selected frequency. A frequency of the monitoring or of the requests from the cloud provisioning service can be set by the customer tenant 230/customer 206, by the cloud provisioning readiness system 202 and/or by the cloud provisioning provider. In one or more cases, this frequency can change, such as in response to transitioning a threshold of one or more failed configuration settings at a time and/or one or more failed configuration settings within a selected time window. Again, such thresholds can be set by the customer tenant 230/customer 206, by the cloud provisioning readiness system 202 and/or by the cloud provisioning provider.

Additionally and/or alternatively, in one or more embodiments, a model 211, such as an AI or ML model can be employed to determine what data to access. Such model 211 can be comprised by the collection component 210, the analysis component 212 and/or can be located otherwise internal or external to the cloud provisioning readiness system 202. The model 211 can be trained on provisioning configurations utilized by the cloud provisioning provider for cloud provisioning of customer endpoints. Based on recognition of these provisioning configurations, the model 211 can determine which configuration data 232 to locate and collect.

In connection with the model 211, in one or more embodiments, the training component 216 can train the model 211 based suitable API calls, logical calls, provisioning configurations and/or configuration settings. The training component 216 can train the model 211 based on terminology and/or one or more languages employed by the customer tenant as compared to those used by the cloud provisioning service provider, such as to better recognize configuration data 232 relevant to customer tenant configurations. In one or more cases, the training component 216 can train the model 211 at a suitable selected frequency, such as after each iteration of data collection.

Accordingly, the model 211 can be employed by the analysis component 212 and/or the collection component 210 to facilitate execution of one or more operations performed by those components. For example, the collection component 210 can employ the model 211 to recognize relevant configuration data 232. For another example, the analysis component 212 can employ the model 211 to pair one or more rules, regulations and/or requirements to the configuration data 232 and/or configuration settings determined from the configuration data 232.

In one or more cases, the training component 216 can train the collection component 210 based on terminology and/or one or more languages employed by the customer tenant as compared to those used by the cloud provisioning service provider, such as to better recognize configuration data 232 relevant to customer tenant configurations. In one or more cases, this training can comprise introduction of one or more API calls, logical calls and/or the like, such as relative to one or more databases employed by the collection component 210. In one or more cases, the training component 216 can train the collection component 210 at a suitable selected frequency, such as after each iteration of data collection.

In response to the data collection by the collection component 210, the configuration data 232 can be analyzed by the analysis component 212. Generally, the analysis component 212 can provide rule-based analysis of customer tenant configurations, including rule-based detection of common failure points of provisioning configurations. The rules can be stored in any suitable format and/or language. Storage can be log, index, matrix and/or database-based. The rules can be updated at any suitable frequency, such as by the cloud provisioning service provider in connection with the cloud provisioning readiness system 202. That is, the analyzing can comprise comparing the configuration settings of the collected configuration data 232 against respective provisioning readiness rules (also herein referred to as provisioning readiness checks). In one or more cases, the analysis is repeatable to determine accuracy of a prior analysis.

In one or more cases, rules can be binary, such as true/false. Other rules can be more specific, such as values employed for timeouts, reboots, group assignments and/or the like.

Based on the analysis, one or more configuration settings can be determined as correct and/or incorrect by the analysis component 212. Additionally and/or alternatively, the analysis component 212 can make a determination that while one or more configuration settings is correct, an amendment to the one or more configuration settings can be warranted, more efficient, and/or provide faster cloud provisioning. In such case, the analysis component 212 can output a warning in addition to and/or as part of outputting an indication of a state of readiness of the customer tenant configurations. It is noted that determination that one or more configurations is unacceptable can be based upon predicted failure of the cloud provisioning.

The state of readiness can be for all customer tenant configurations, one or more groups of customer tenant configurations and/or for one or more customer tenant configurations. The varying one or more states of readiness can be output in a report 240, such as for use by the customer 206 and/or by a cloud provisioning service provider (e.g., an entity employing the cloud provisioning readiness system 202). The outputting and/or generation of the report 240 can be executed by the reporting component 214.

Furthermore, in response to the analysis of the configuration settings by the analysis component 212, the reporting component 214 and/or the analysis component 212 can output an indication to the cloud provisioning service and/or to endpoint production (see, e.g., FIG. 1) that the current operations should continue, slow, speed up and/or be delayed. For example, in response to determining that a configuration is not acceptable for use in the cloud provisioning, an indication to not execute the cloud provisioning of the device can be output. In another example, in response to the configurations being acceptable, an indication to execute cloud provisioning can be output.

Also in response to the analysis of the configuration settings by the analysis component 212, the reporting component 214 can output a report of configuration/cloud provisioning readiness. Generally the report, such as the report 240, can be output to the customer 206. In one or more cases a report 240 can be provided by a customer portal, webpage and/or other method accessible to the customer tenant. The report 240 and/or customer portal can be updated each time an analysis is completed to provide continuous feedback to the customer 206.

Figure 4:
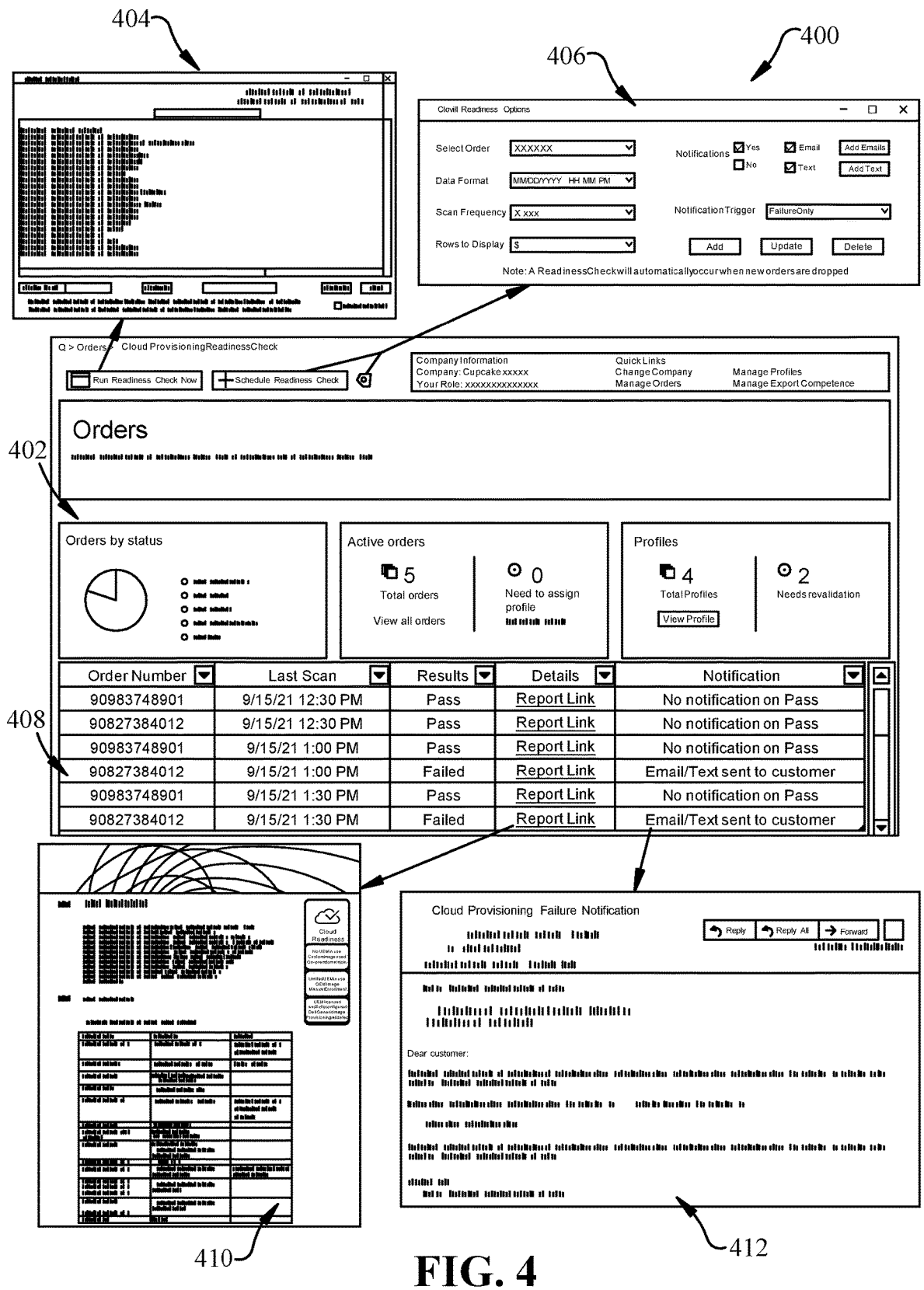
FIG. 4 illustrates exemplary cloud provisioning readiness report operations, in accordance with one or more embodiments and/or implementations described herein.

For example, turning briefly to FIG. 4, illustrated is an exemplary schematic 400 of a report 402 that can be output by the reporting component 214 in response to the determination of readiness. The report 402, which can be employed as the report 240, can provide a visual display of readiness including pass/fail indication 408 of particular configuration items, a general notification 412, status reports 410, and/or readiness check run script/results 404. The status reports 410 and/or pass/fail indications 408 can employ a color-coding system to allow for easy visual identification by a customer tenant entity. Also included in the report 402 and/or portal can be the ability to selectively determine one or more options 406, such as reporting communication type, scan frequency, search settings, display order settings, general display settings and/or the like.

In one or more cases, the report 402 can serve as an actional list of items to be remediated prior to continuing with and/or executing cloud provisioning. In one or more cases, the report 402 can serve as a final validation of customer readiness for approval of placing orders for endpoint devices.

Turning again to FIG. 2, the cloud provisioning readiness system 202 can comprise a remediation component 218. The remediation component 218 can, in response to determining that a configuration is not acceptable for use in the cloud provisioning, suggest/recommend a suitable correction and/or go forward with executing the correction.

In one or more cases, the correcting can be completed automatically absent authorization from the customer tenant. In such case, an initial authorization for automatic remediation can be requested and/or obtained from the customer tenant. This can be achieved via the portal, at onboarding, and/or by one or more selected settings that can be set by the customer tenant. That is, the remediation component 218 can obtain authorization from the customer tenant to perform future remediation of failed customer tenant configuration absent further authorization. In such case, in response to a warning or an indication of a failed configuration, the remediation component 218 can perform remediation of a customer tenant configuration to achieve an indication of readiness.

In one or more cases a remediation recommendation first can be submitted by the reporting component 214 and/or by the remediation component 218 to the customer tenant. The customer tenant can approve remediation by the system 202 in accordance with the recommendation, suggest an alternative fix, and/or go forward with fixing the configuration itself. Where the configuration is amended by the customer tenant, another configuration analysis can be performed to verify readiness of the altered configuration.

Figure 5:
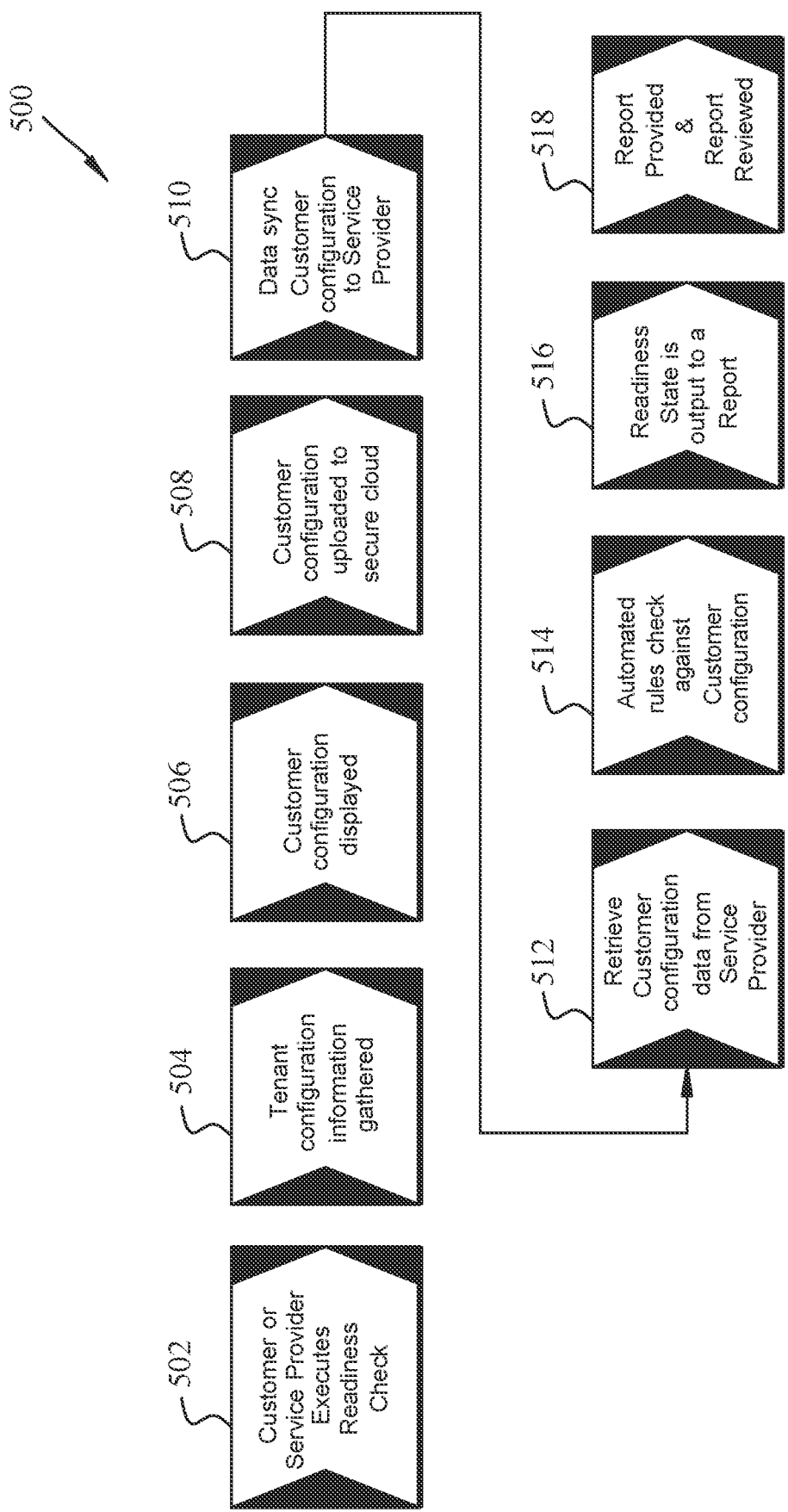
FIG. 5 illustrates a process flow diagram of a general method of cloud provisioning readiness verification, in accordance with one or more embodiments and/or implementations described herein.

Turning now to FIG. 5, illustrated is a schematic of a high level process flow 500 that can be operated by the non-limiting architecture 200 of FIG. 2, to thus provide a summary. Although shown in any particular order, the one or more operations 502-518 can be operated in a different order. One or more operations can be executed concurrently with one or more other operations. Repetitive description of like elements and/or processes employed in respective embodiments is omitted for sake of brevity.

At operation 502, the customer and/or service provider can execute a readiness check. At 504, the customer tenant configuration information/data 232 can be gathered/collected, such as by the collection component 210. At 506, the customer configuration data can be displayed to the customer 206 and/or to the service provider. At 508, the customer configuration data can be uploaded to a secure cloud, such as of the service provider. At 510, sync of the data to the service provider can be executed. At 512, the service provider, such as the provisioning readiness system 202, can retrieve the configuration data. At 514, analysis of the customer configurations can be executed, such as comprising one or more automated rules checks, such as performed by the analysis component 212. At 516, a readiness state can be output, such as by the analysis component 212 to the reporting component 214. As a result, at 518, the report can be provided, such as by the reporting component 214 outputting the report 240 and/or 402. The report can be reviewed by the customer and/or service provider.

Figure 6:
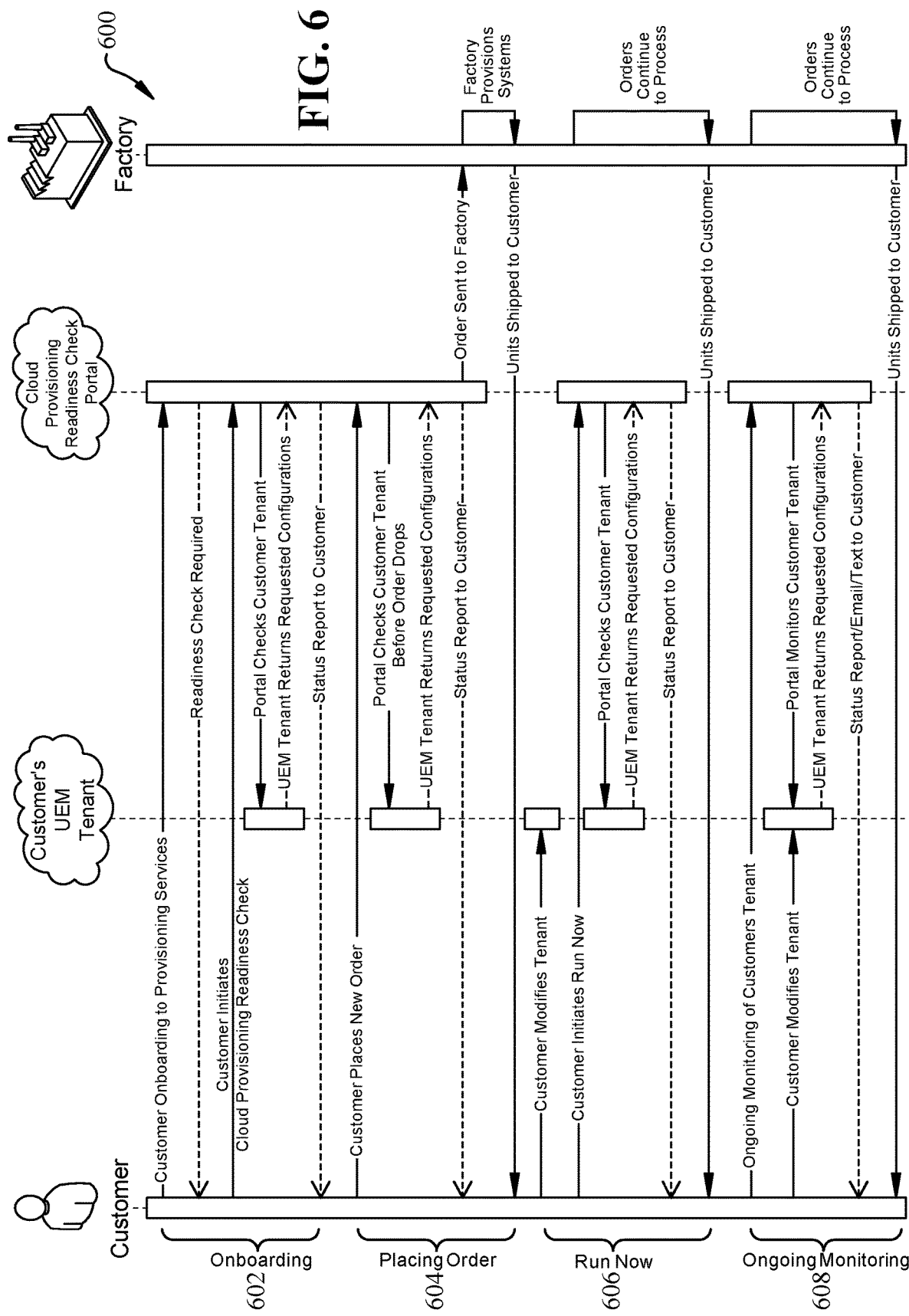
FIG. 6 illustrates another process flow diagram of varying cloud provisioning readiness verifications, in accordance with one or more embodiments and/or implementations described herein.

Turning next to FIG. 6, illustrated is a detailed schematic of a process flow 600 of various readiness checks that can be performed by a provisioning readiness system in accordance with one or more embodiments described herein, such as the cloud provisioning readiness system 202. Repetitive description of like elements and/or processes employed in respective embodiments is omitted for sake of brevity.

As illustrated, a readiness check can be performed at various stages and/or requested by various entities. An onboarding readiness check 602 can be performed for a new customer, an order readiness check 604 can be performed when a customer requests/places an order, an on-demand readiness check 606 can be performed at request of the customer and/or service provider, and/or a monitoring readiness check 608 can be performed as part of ongoing monitoring of customer tenant configurations.

Example Readiness Check Operations

Figure 7:
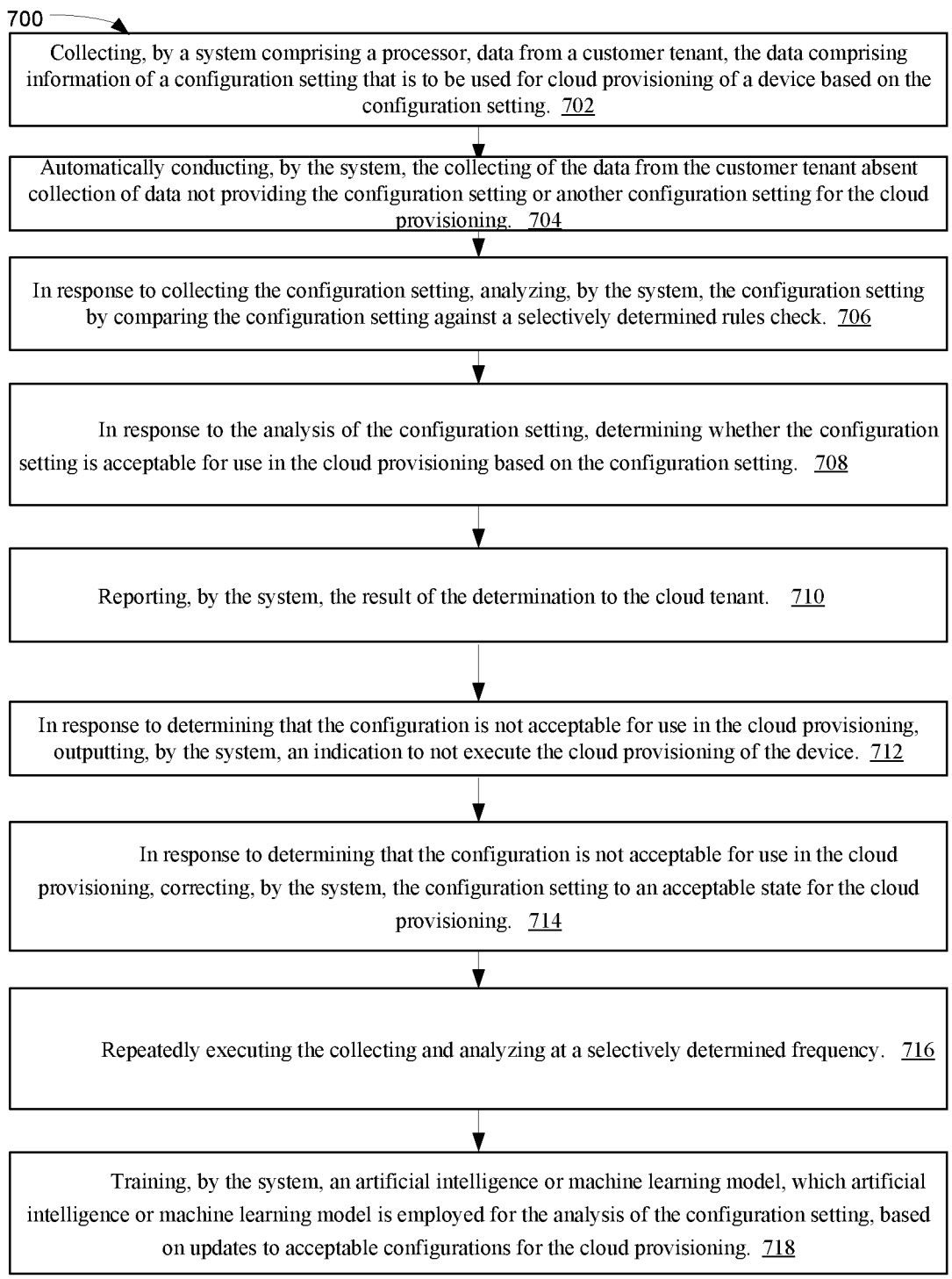
FIG. 7 illustrates a process flow diagram of a method of cloud provisioning readiness verification, in accordance with one or more embodiments and/or implementations described herein.

Turning now to FIG. 7, a process flow comprising a set of operations is illustrated relative to FIG. 2. One or more elements, objects and/or components referenced in the process flow 700 can be those of architecture 100 and/or diagram 200. Repetitive description of like elements and/or processes employed in respective embodiments is omitted for sake of brevity.

At operation 702, the process flow 700 can comprise collecting, by a system comprising a processor (e.g., collection component 210), data based on user input from a customer tenant via a user interface, the data comprising information of a configuration setting that is to be used for cloud provisioning of a device based on the configuration setting.

At operation 704, the process flow 700 can comprise limiting, by the system (e.g., collection component 210), the collecting of the data from the customer tenant to data upon which the configuration setting is based, or to data upon which another configuration setting for the cloud provisioning is based.

At operation 706, the process flow 700 can comprise, in response to collecting the configuration setting, analyzing, by the system (e.g., analysis component 212), the configuration setting by comparing the configuration setting with respect to a selectively determined rules check.

At operation 708, the process flow 700 can comprise, in response to the analyzing of the configuration setting (e.g., analysis component 212), determining, by the system, whether the configuration setting is acceptable for use in the cloud provisioning based on the configuration setting.

At operation 710, the process flow 700 can comprise reporting, by the system (e.g., reporting component 214), a result of the determining via the user interface to the cloud tenant.

At operation 712, the process flow 700 can comprise, in response to determining that the configuration is not acceptable for use in the cloud provisioning, outputting, by the system (e.g., analysis component 212), an indication not to execute the cloud provisioning of the device.

At operation 714, the process flow 700 can comprise, in response to determining that the configuration is not acceptable for use in the cloud provisioning, correcting, by the system (e.g., remediation component 218), the configuration setting to comprise an acceptable state for the cloud provisioning.

At operation 716, the process flow 700 can comprise repeatedly, by the system (e.g., cloud provisioning system 202), executing the collecting and the analyzing at a selected frequency.

At operation 718, the process flow 700 can comprise training, by the system (e.g., training component 216), an artificial intelligence or machine learning model, wherein the artificial intelligence or machine learning model is employed for the analyzing of the configuration setting based on updates to acceptable configurations for the cloud provisioning.

Figure 8:
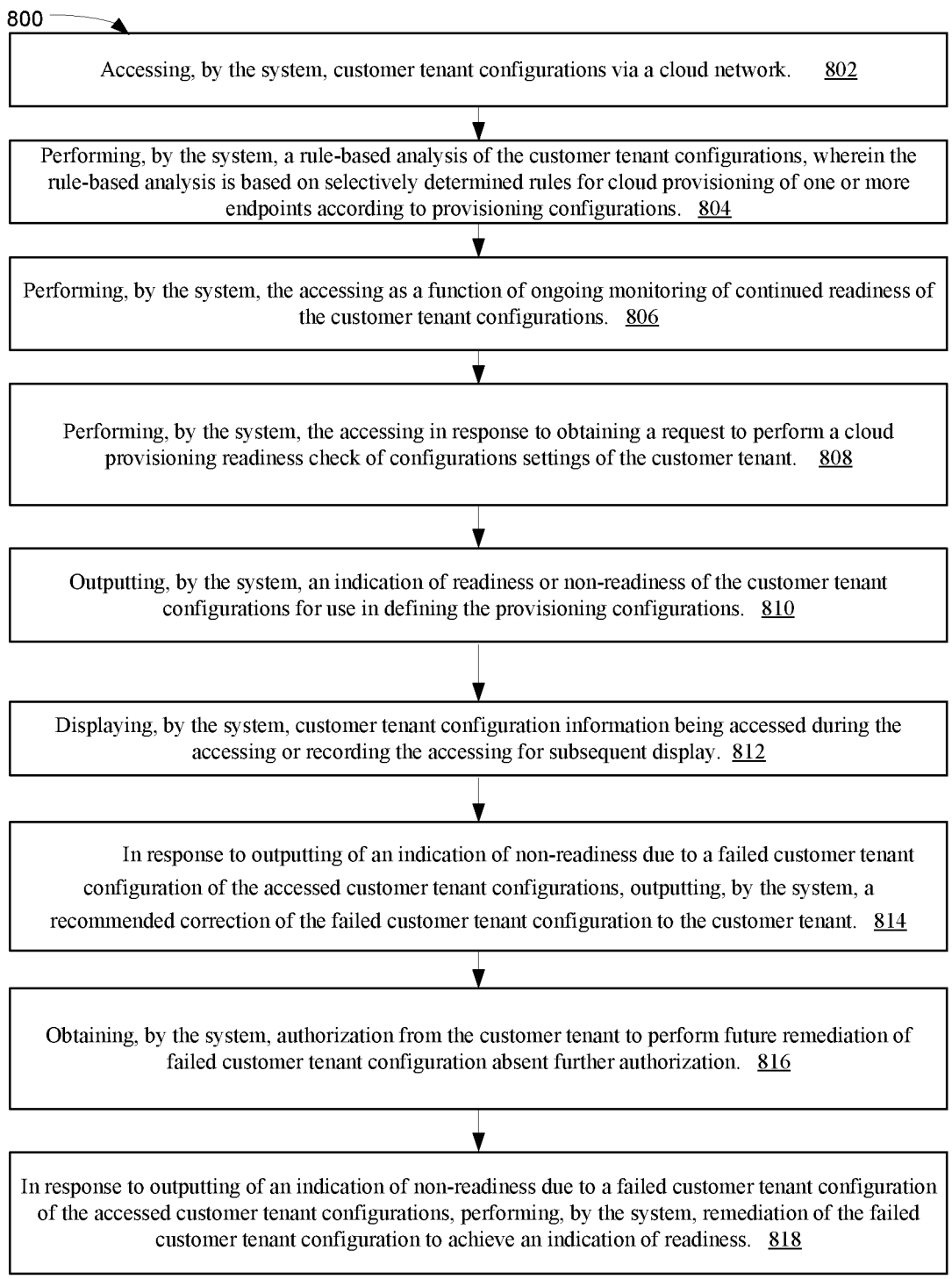
FIG. 8 illustrates a process flow diagram of a method of cloud provisioning readiness verification, in accordance with one or more embodiments and/or implementations described herein.

Turning now to FIG. 8, a process flow comprising a set of operations is illustrated relative to FIG. 2. One or more elements, objects and/or components referenced in the process flow 800 can be those of architecture 100 and/or diagram 200. Repetitive description of like elements and/or processes employed in respective embodiments is omitted for sake of brevity.

At operation 802, the process flow 800 can comprise accessing, by the system (e.g., collection component 210), customer tenant configurations via a cloud network connected to a customer tenant device of a customer tenant comprising the customer tenant configurations.

At operation 804, the process flow 800 can comprise performing, by the system (e.g., analysis component 212), a rule-based analysis of the customer tenant configurations, wherein the rule-based analysis is based on rules determined to be applicable to cloud provisioning at least one endpoint device to be performed according to provisioning configurations to be defined.

At operation 806, the process flow 800 can comprise performing, by the system (e.g., collection component 210), the accessing as a function of ongoing monitoring of continued readiness of the customer tenant configurations.

At operation 808, the process flow 800 can comprise performing, by the system (e.g., collection component 210), the accessing in response to obtaining a request to perform a cloud provisioning readiness check of configurations settings of the customer tenant.

At operation 810, the process flow 800 can comprise, based on a result of the rule-based analysis, outputting, by the system (e.g., reporting component 214), an indication of readiness or non-readiness of the customer tenant configurations for use in defining the provisioning configurations.

At operation 812, the process flow 800 can comprise displaying, by the system (e.g., reporting component 214), customer tenant configuration information being accessed during the accessing or recording the accessing for subsequent display.

At operation 814, the process flow 800 can comprise, in response to the outputting of the indication of non-readiness due to a failed customer tenant configuration of the customer tenant configurations, outputting, by the system (e.g., remediation component 218), a recommended correction of the failed customer tenant configuration to the customer tenant.

At operation 816, the process flow 800 can comprise obtaining, by the system (e.g., remediation component 218), via the customer tenant device, authorization from the customer tenant to perform future remediation of failed customer tenant configurations absent additional authorization to perform the future remediation.

At operation 818, the process flow 800 can comprise, in response to the outputting of the indication of non-readiness due to a failed customer tenant configuration of the customer tenant configurations, performing, by the system (e.g., remediation component 218), remediation of the failed customer tenant configuration to change the indication from non-readiness of the failed customer tenant configuration to readiness of a resulting remediated customer tenant configuration.

For simplicity of explanation, the computer-implemented methodologies and/or processes provided herein are depicted and/or described as a series of acts. The subject innovation is not limited by the acts illustrated and/or by the order of acts, for example acts can occur in one or more orders and/or concurrently, and with other acts not presented and described herein. The operations of process flows of illustrations 400, 600, 700 and/or 800 are example operations, and there can be one or more embodiments that implement more or fewer operations than are depicted.

Furthermore, not all illustrated acts can be utilized to implement the computer-implemented methodologies in accordance with the described subject matter. In addition, the computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, technology described herein can verify readiness of a customer tenant/customer for cloud provisioning based on the customer tenant. An example method comprises collecting, by a system comprising a processor, data based on user input from a customer tenant via a user interface, the data comprising information of a configuration setting that is to be used for cloud provisioning of a device based on the configuration setting. The method comprises, in response to collecting the configuration setting, analyzing, by the system, the configuration setting by comparing the configuration setting with respect to a selected rules check. The method comprises, in response to the analyzing of the configuration setting, determining, by the system, whether the configuration setting is acceptable for use in the cloud provisioning based on the configuration setting.

As a result, a method can be provided to verify a customer tenant for cloud provisioning. A readiness check can be performed as part of an onboarding process for provisioning services. The readiness check can evaluate customer and/or customer tenant readiness for provisioning relative to one or more thresholds, to thereby reduce configuration errors, reduce provisioning downtime, reduce post-provisioning troubleshooting, improve efficiency and/or improve overall customer satisfaction. As used herein a customer tenant refers to a group of user entities that share a common access with specific privileges to software, applications, hardware, servers, networks and/or the like. Entities in a tenant can share configurations, access and/or security protocols.

One or more embodiments of devices, systems, methods and/or non-transitory machine-readable mediums will be described herein that can provide one or more advantages while addressing the one or more deficiencies of existing techniques of existing cloud provisioning.

In one or more cases, even where a customer is not aware of configuration setting affecting and/or impacting cloud provisioning, and/or even where a customer and a server provider can have differing interpretations of one or more configurations, efficient readiness verification can be facilitated. Furthermore, delays, manual touch points, data inaccuracies, subjective data gathering and/or data inaccuracies can be reduced and/or eliminated as compared to existing provisioning techniques.

Indeed the one or more embodiments described herein can provide an automated process for configuration checking, and with client permission, can also provide automatic adjustments to configurations of a client tenant. This can reduce errors introduced by manual, time-consuming and/or labor-intensive existing provisioning readiness processes. Reduced back-and-forth between provisioning services and customer can be facilitated. Further, monitoring access to the readiness check can be provided to the client, such as via an easily accessible portal, webpage, graphical user interface (GUI) and/or the like.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein are inherently and/or inextricably tied to computer technology and cannot be implemented outside of a computing environment. For example, one or more processes performed by one or more embodiments described herein can more efficiently, and even more feasibly, provide program and/or program instruction execution as compared to existing systems and/or techniques. Systems, computer-implemented methods and/or computer program products facilitating performance of these processes are of great utility in the field of cloud provisioning, such as over a cloud-provided network, and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively automatically gather tenant digital data, perform digital checks, and/or conduct cloud provisioning services as the one or more embodiments described herein can facilitate these processes. And, neither can the human mind nor a human with pen and paper automatically gather tenant digital data, perform digital checks, and/or conduct cloud provisioning services as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud computing systems, computer architecture and/or another technology.

One or more embodiments described herein can be fully operational towards performing one or more other functions (e.g., fully powered on, fully executed and/or another function) while also performing the one or more operations described herein.

Example Operating Environment

Figure 9:
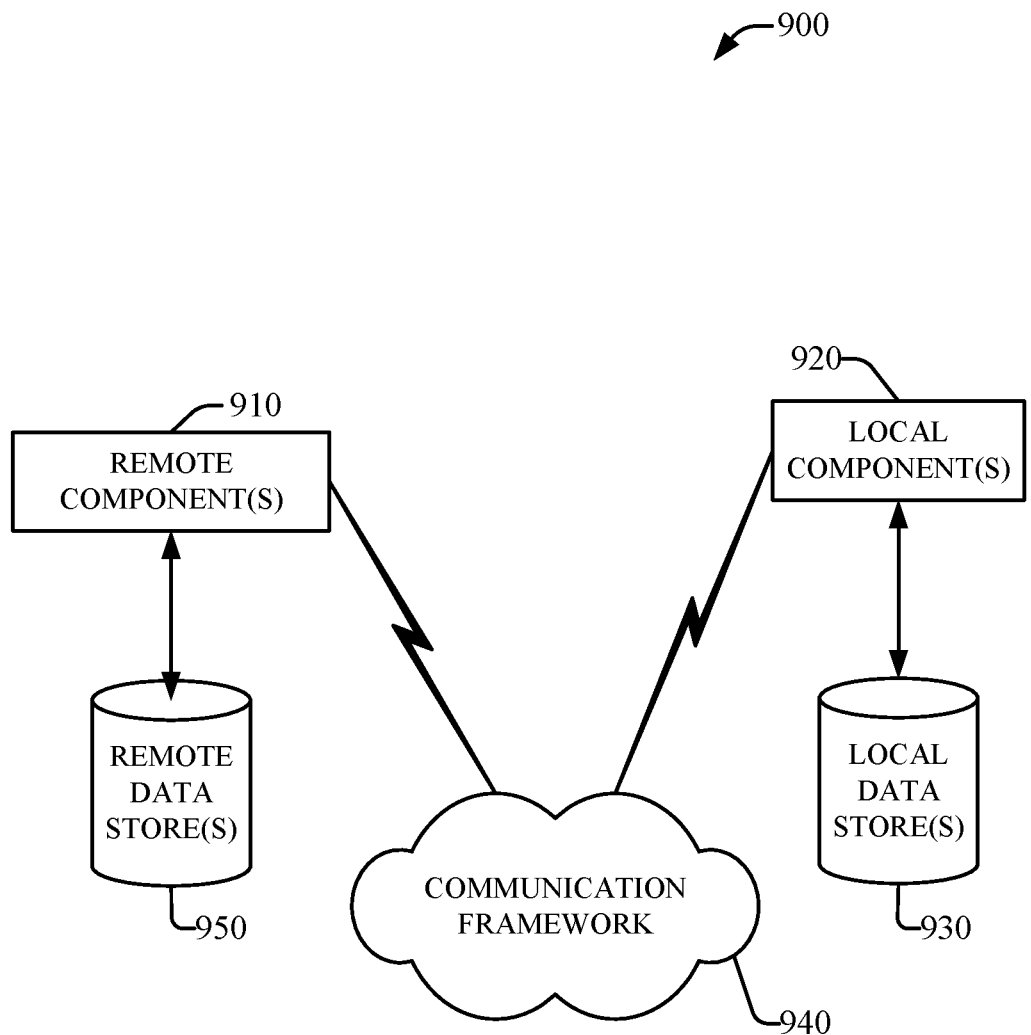
FIG. 9 illustrates a block diagram of an example operating environment into which embodiments of the subject matter described herein can be incorporated.

FIG. 9 is a schematic block diagram of an operating environment 900 with which the described subject matter can interact. The operating environment 900 comprises one or more remote component(s) 910. The remote component(s) 910 can be hardware and/or software (e.g., threads, processes, computing devices). In one or more embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The operating environment 900 also comprises one or more local component(s) 920. The local component(s) 920 can be hardware and/or software (e.g., threads, processes, computing devices). In one or more embodiments, local component(s) 920 can comprise an automatic scaling component and/or programs that communicate/use the remote resources 910 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The operating environment 900 comprises a communication framework 940 that can be employed to facilitate communications between the remote component(s) 910 and the local component(s) 920, and can comprise an air interface, e.g., interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Example Computing Environment

Figure 10:
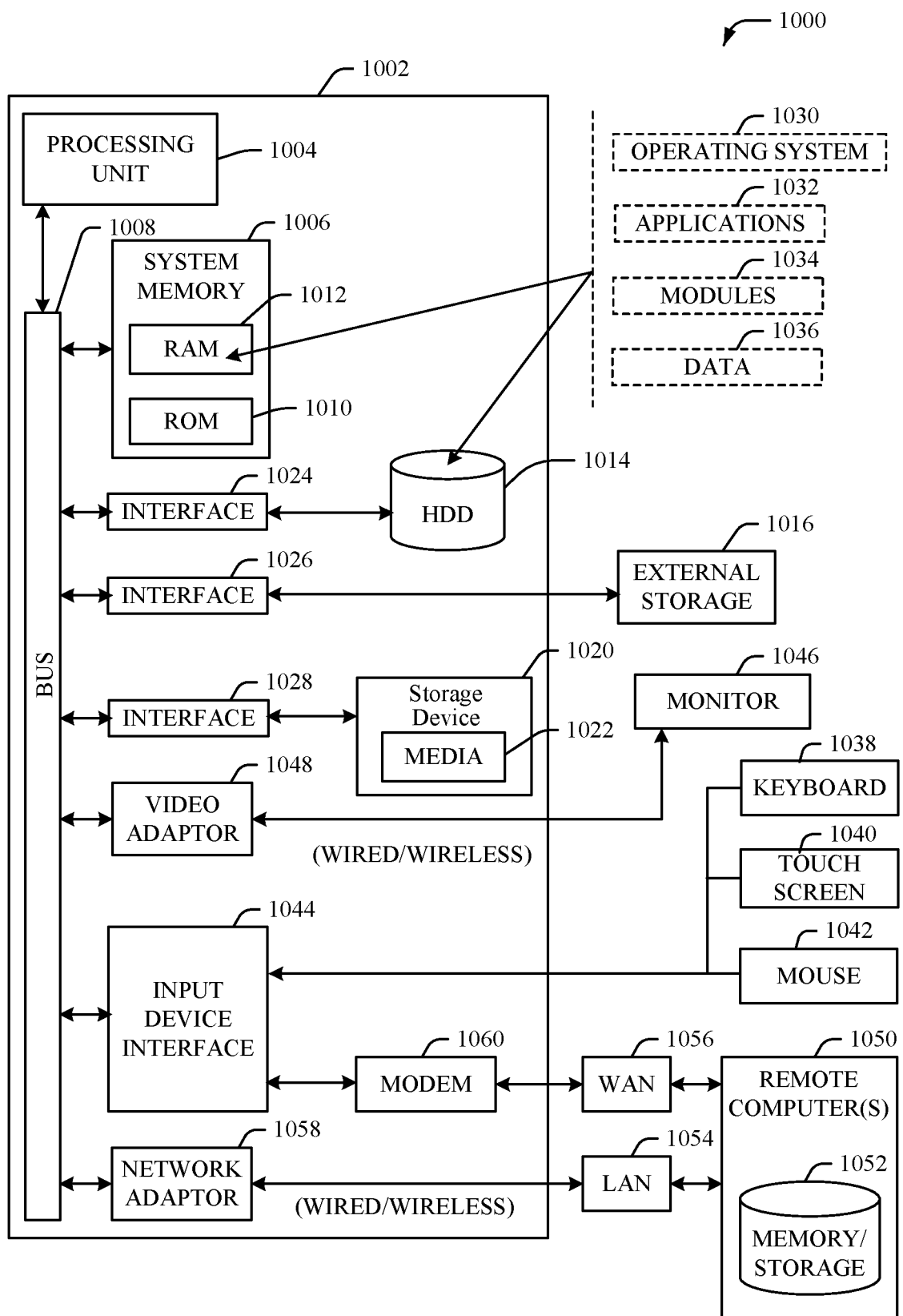
FIG. 10 illustrates an example schematic block diagram of a computing environment with which the subject matter described herein can interact and/or be implemented at least in part, in accordance with one or more embodiments and/or implementations described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 10, the example computing environment 1000 which can implement one or more embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multiprocessor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in computing environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. The network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding figures, where applicable, other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. However, there is no intention to limit the various embodiments to the one or more specific forms described, but on the contrary, the intention is to cover all modifications, alternative constructions, and equivalents falling within the spirit and scope.

In addition to the various implementations described herein, other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A method, comprising:
   collecting, by a system comprising a processor, data based on user input from a customer tenant the data comprising information of a configuration setting that is to be used for cloud provisioning of a device based on the configuration setting;
   in response to collecting the configuration setting, analyzing, by the system, the configuration setting by employing an artificial intelligence model that pairs the configuration setting with rules to conduct rules check, wherein the configuration setting employs a terminology or language different from the rules, and wherein the artificial intelligence model is trained to perform the pairing in view of the terminology or the language;
   in response to the analyzing of the configuration setting, determining, by the system, whether the configuration setting is acceptable for use in the cloud provisioning based on the configuration setting; and
   in response to a result of the determining indicating acceptability for use in the cloud provisioning, automatically authorizing and performing correcting, by the system, of the configuration setting to comprise an acceptable state for the cloud provisioning.

2. The method of claim 1, further comprising:
   reporting, by the system, the result of the determining via the user interface to the cloud tenant.

3. The method of claim 1, further comprising:
   training, by the system, the artificial intelligence model, wherein the artificial intelligence model is employed for the analyzing of the configuration setting based on updates to acceptable configurations for the cloud provisioning.

4. The method of claim 1, further comprising:
   conducting, by the system, the collecting of the data from the customer tenant in response to determining the configuration setting for the cloud provisioning is absent or determining another configuration setting for the cloud provisioning is absent.

5. The method of claim 1, further comprising:
   repeatedly, by the system, executing the collecting and the analyzing at a selected frequency.

6. The method of claim 1, further comprising:
   in response to the result of the determining indicating that the configuration is not acceptable for use in the cloud provisioning, outputting, by the system, an indication not to execute the cloud provisioning of the device.

7. The method of claim 1, wherein the correcting is performed without receiving authorization from the customer tenant to authorize or perform the correcting.

8. The method of claim 1, wherein the determining indicating the acceptability comprises the determining indicating that the configuration setting is acceptable, wherein the correcting of the configuration setting to comprise the acceptable state for the cloud provisioning results in a corrected configuration setting, and wherein the corrected configuration setting enables a higher level of acceptability of the acceptable state than achievable employing the configuration setting.

9. The method of claim 1, further comprising:
   prior to the correcting, transmitting, by the system, a request to perform a remediation to a customer tenant device associated with the customer tenant and receiving, in response to the request, an approval to proceed with the correcting.

10. A cloud provisioning readiness system, comprising:
    a processor, and a memory that stores executable instructions that, when executed by the processor, facilitate performance of operations, comprising:
    obtaining data defining a request to perform a cloud provisioning readiness check of configuration settings associated with a customer tenant;
    analyzing the configuration settings associated with the customer tenant prior to execution of cloud provisioning based on the configuration settings,
    wherein the analyzing comprises employing an artificial intelligence model that pairs data from the customer tenant, which is recognized by the artificial intelligence model as being related to a configuration setting of the configuration settings, with a group of provisioning readiness rules corresponding to configuration requirements;
    in response to and based on the analyzing by the artificial intelligence model, determining whether the configuration settings, as a group, are acceptable; and
    in response to at least one configuration setting of the group being determined to be separately unacceptable, executing the cloud provisioning at a first speed at which the execution of the cloud provisioning is performed to a non-zero speed, wherein the first speed is different from a second speed of execution of the cloud provisioning prior to the determining the at least one configuration setting to be unacceptable.

11. The cloud provisioning readiness system of claim 10, wherein the operations further comprise:
in response to the configuration settings being determined to be acceptable, outputting an indication to perform the execution of the cloud provisioning,
wherein a determination to perform the correcting and the execution of the correcting are performed absent receipt of authorization from the customer tenant to perform the correcting.

12. The cloud provisioning readiness system of claim 10, wherein the operations further comprise:
in response to at least one configuration setting of the group being determined to be unacceptable, executing a remediation of the at least one configuration setting.

13. The cloud provisioning readiness system of claim 10, wherein the analyzing comprises obtaining the group of provisioning readiness rules having a different language or a different terminology than the customer tenant data.

14. The cloud provisioning readiness system of claim 10, wherein the configuration settings apply to different endpoints to be cloud provisioned based on the configuration settings.

15. The cloud provisioning readiness system of claim 10, wherein the obtaining of the request comprises receiving the request from a user device associated with the customer tenant.

16. The cloud provisioning readiness system of claim 10, wherein the obtaining of the request comprises obtaining, repeatedly at a selected frequency, the request from a service provider device associated with a service provider that performs the cloud provisioning.

17. A non-transitory machine-readable medium, comprising executable instructions that, when executed by a processor facilitate performance of operations, comprising:
accessing data, at a customer tenant device of a customer tenant, that defines customer tenant configurations, wherein the accessing is performed via a cloud network connected to the customer tenant device comprising the customer tenant configurations;
wherein the accessing is performed employing an artificial intelligence model trained to recognize customer tenant data that is usable to determine the customer tenant configurations, wherein the customer tenant data comprises a different formatting than formatting employed by a cloud provisioning service provider employing the processor;
performing a rule-based analysis of the customer tenant configurations, wherein the rule-based analysis is based on rules determined to be applicable to cloud provisioning of at least one endpoint device to be performed according to provisioning configurations to be defined;
based on a result of the rule-based analysis, authorizing and performing correction of the customer tenant configurations to comprise acceptable formatting for the cloud provisioning, and outputting an indication of readiness or non-readiness of the customer tenant configurations for use in defining the provisioning configurations; and
enabling tracking, by the customer tenant, of the data that is being accessed by displaying the data that is being accessed during the accessing or by recording the accessing for subsequent display.

18. The non-transitory machine-readable medium of claim 17, wherein the operations further comprise:
performing the accessing as a function of ongoing monitoring of continued readiness of the customer tenant configurations.

19. The non-transitory machine-readable medium of claim 18, wherein the operations further comprise:
in response to the outputting of the indication comprising the outputting of the indication of non-readiness due to a failed customer tenant configuration of the customer tenant configurations, including correction of the failed customer tenant configuration in the correction of the customer tenant configurations to comprise the acceptable formatting for the cloud provisioning.

20. The non-transitory machine-readable medium of claim 17, wherein the operations further comprise:
obtaining, via the customer tenant device, authorization from the customer tenant to perform future remediation of failed customer tenant configurations absent additional authorization to perform the future remediation; and
in response to the authorization, performing the correction of the customer tenant configurations to comprise the acceptable formatting for the cloud provisioning comprising changing the indication from non-readiness of the failed customer tenant configurations to readiness of a resulting remediated customer.

* * * * *